United States Patent [19]

Taki

[11] Patent Number: 4,771,415

[45] Date of Patent: Sep. 13, 1988

[54] OPTICAL DATA STORAGE AND READOUT APPARATUS AND HEAD, USING OPTICAL FIBERS BETWEEN STATIONARY AND MOVABLE UNITS

[75] Inventor: Kazunari Taki, Nagoya, Japan

[73] Assignee: Brother Kogyo Kabushiki Kaisha, Aichi, Japan

[21] Appl. No.: 832,231

[22] Filed: Feb. 24, 1986

[30] Foreign Application Priority Data

Feb. 27, 1985 [JP] Japan .................................. 60-38281
Feb. 28, 1985 [JP] Japan .................................. 60-39775

[51] Int. Cl.$^4$ ............................................. G11B 7/00
[52] U.S. Cl. .................................. 369/112; 369/121; 369/44; 369/46
[58] Field of Search ............... 369/111, 112, 121, 122, 369/44, 46.

[56] References Cited

U.S. PATENT DOCUMENTS

| | | | |
|---|---|---|---|
| 3,235,672 | 2/1966 | Beguin | 369/111 X |
| 4,546,463 | 10/1985 | Opheij et al. | 365/122 X |
| 4,559,573 | 12/1985 | Tanaka et al. | |
| 4,612,587 | 9/1986 | Kaneko et al. | |
| 4,670,865 | 6/1937 | Hatano | |

FOREIGN PATENT DOCUMENTS

| | | | |
|---|---|---|---|
| 56-68937 | 6/1981 | Japan | 369/112 |
| 56-15354 | 11/1981 | Japan | |
| 56-148770 | 11/1981 | Japan | 369/44 |
| 58-125244 | 7/1983 | Japan | 369/121 |
| 58-150146 | 9/1983 | Japan | 369/121 |
| 59-215037 | 12/1984 | Japan | |
| 59-215044 | 12/1984 | Japan | |
| 107553 | 5/1986 | Japan | |

OTHER PUBLICATIONS

IBM Technical Disclosure Bulletin, vol. 23, No. 7A, Dec. 1980; Han, p. 2992.
IBM Technical Disclosure Bulletin, vol. 23, No. 7A, Dec. 1980; Lean, p. 2994.
IBM Technical Disclosure Bulletin, vol. 14, No. 5, Oct. 71, Kazan, pp. 1362-1364.
English Translation of JP 58-150146.

Primary Examiner—Aristotelis M. Psitos
Attorney, Agent, or Firm—Parkhurst & Oliff

[57] ABSTRACT

An optical data storage and readout apparatus having an optical head which includes a light source device for producing laser beams, a device for converging the laser beams on a selected area of a surface of an optical recording medium on or from which information is recorded or read out, and an optical detecting device for detecting signal beams reflected by or transmitted through the selected area of the recording medium which is irradiated by the converged laser beams. The optical head has at least one light-emitting optical fiber which receives at its one end the laser beams from the light source device and emits the laser beams from its other end toward the surface of the recording medium. The optical head further has a plurality of light-receiving optical fibers which receive at their one end the signal beams from the selected area of the recording medium, and transmit the signal beams to the optical detecting device.

19 Claims, 12 Drawing Sheets

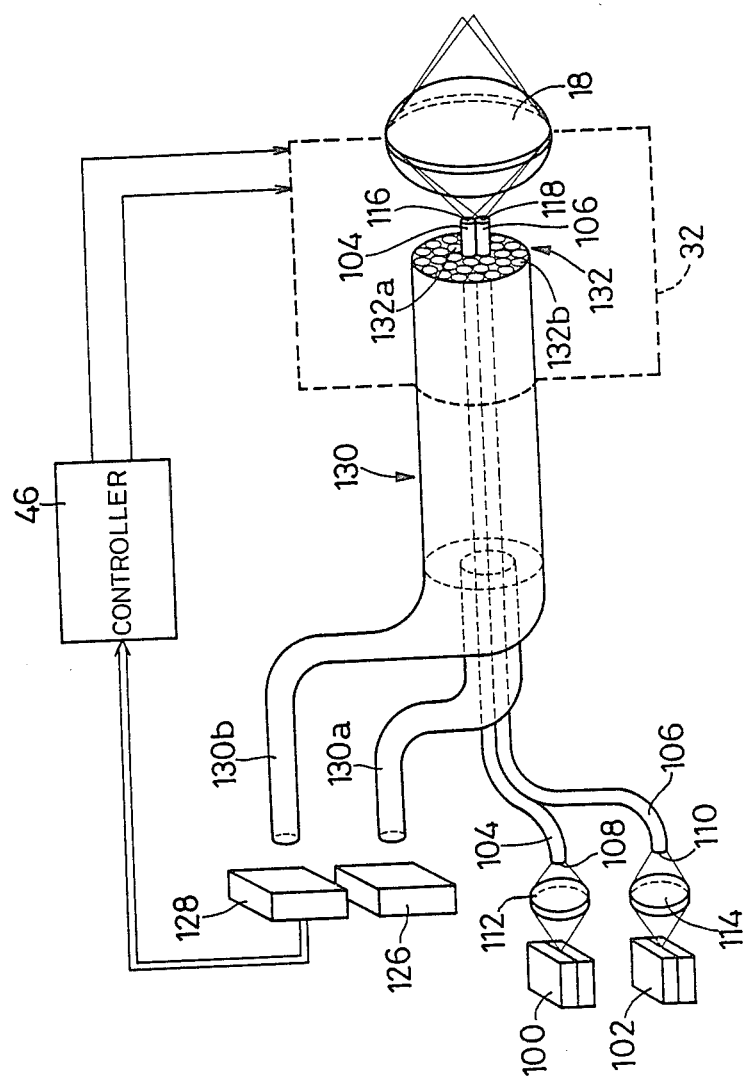

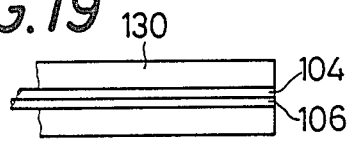
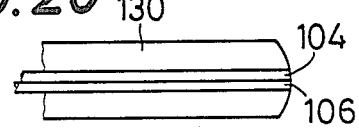
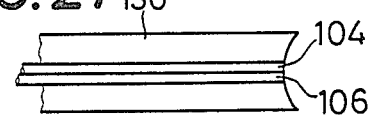
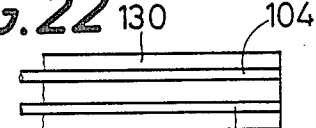
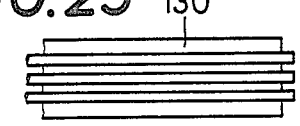
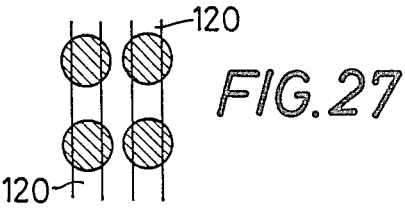

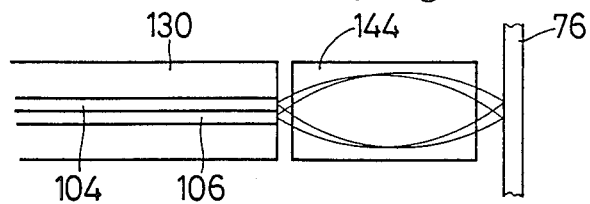
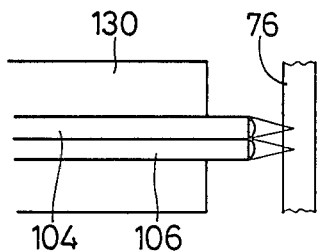
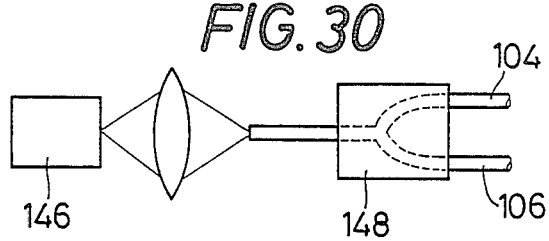
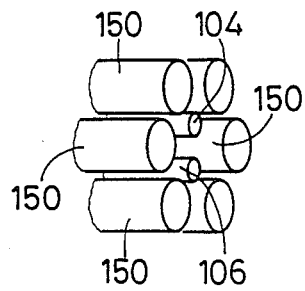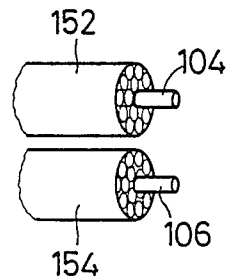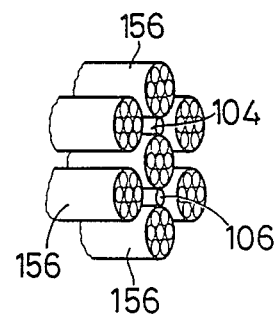

PRIOR ART

OPTICAL DATA STORAGE AND READOUT APPARATUS AND HEAD, USING OPTICAL FIBERS BETWEEN STATIONARY AND MOVABLE UNITS

BACKGROUND OF THE INVENTION

The present invention relates to an apparatus for optical storage and readout or retrieval of information on or from an optical recording medium such as an optical or magneto-optical disk.

In the art of data storage and readout, an optical recording and reproducing apparatus is known in which an appropriate area on an optical recording medium is irradiated by a laser beam produced by a laser source, and a light beam reflected by the irradiated area on the recording medium is detected by a suitable optical sensor. An optical data storage and readout apparatus of the type indicated above has a sophisticated optical head which is constructed to converge laser beams at a specified pont or spot on the optical recording medium, and to receive a reflected light from the irradiated spot on the medium, so that the reflected light may be detected by a light sensitive element. An example of an arrangement of the conventional optical head is illustrated in FIG. 35, wherein laser beams radiated by a laser source 200 are condensed into parallel rays by a collimator lens 202, and the parallel rays are transmitted to an objective lens 208, passing through a beam splitter 204 and a quarter-wave plate 206. The parallel rays incident upon the objective lens 208 are converged at a selected point on an optical recording medium 210. The light beam reflected by the recording medium 210 is passed through the objective lens 208 and the quarter-wave plate 206, and reflected by the beam splitter 204. The light beam reflected by the beam splitter 204 is transmitted through a convex lens 212 and a cylindrical lens 214, and finally received by an optical sensor 216. This optical sensor 216 comprises a plurality of light-sensitive elements, and is adapted to produce tracking and focusing signals, as well as data signals indicative of information recorded on the recording medium. More specifically described, the optical head incorporates a device for moving the objective lens 208 along its optical axis, based on the focusing signal, for adjusting the focal point of the laser beam emitted from the objective lens 208, so as to compensate for a variation in the surface position of the recording medium 210 in the direction parallel to the optical axis of the objective lens 208. Further, the optical head incorporates another device for moving the objective lens 208 along the surface of the recording medium 210, based on the tracking signal, for moving the focal point of the emitted laser beam along the medium surface, in order to aim the laser beam at a specified point within the width of the appropriate recording track on the medium, since the radial position of the tracks may be varied for some reason or other. Alternatively, the optical head may use a tracking mirror for adjustment of the emitted laser beam along the medium surface. In this case, the optical head requires a device for operating the tracking mirror.

In the known apparatus as indicated above, however, the time for an access to a selected recording track on the recording medium is not short enough for high-speed data storage and readout operations, because of the relatively large size and weight of the optical head which houses a large number of various optical components such as a laser source, collimator lens, roof mirror or beam splitter, quarter-wave plate, objective lens, convex lens, cylindrical lens and optical sensors, as previously indicated, and the optical head requires a massive rigid frame for supporting these optical components so as to maintain precise alignment relative to each other. Further, the optical head suffers a loss of light energy during propagation of the light through so many components. Moreover, the use of such a large number of optical components and the requirement of precise relative alignment of the components increase the cost of manufacture of the optical apparatus. The inconveniences addressed above are prominent, especially where the apparatus is adapted to aim laser beams at a plurality of spots on a recording medium.

SUMMARY OF THE INVENTION

It is accordingly an objective of the present invention to provide an apparatus for optical data storage and readout which is comparatively lightweight and simple in construction, and which permits a fast and accurate access to a selected point on an optical recording medium, with a minimum loss of light during propagation through the optical system.

According to the present invention, there is provided an optical data storage and readout apparatus having an optical head which includes a light source device for producing laser beams, means for converging the laser beams on a selected area of a surface of an optical recording medium on or from which information is recorded or read out, and an optical detecting device for detecting signal beams reflected by or transmitted through the selected area of the recording medium, comprising: at least one light-emitting optical fiber which receives at its one end the laser beams from the light source device and emits the laser beams from the other end toward the surface of the recording medium; and a plurality of light-receiving optical fibers which receive at their one end the signal beams from the selected area of the recording medium, and transmit the signal beams to said optical detecting device.

In the optical data storage and readout apparatus of the invention constructed as described above, the laser beams which are produced by the light source device and which irradiate the selected area on the recording medium are transmitted through the light-emitting optical fiber, and the signal beams which are reflected by or transmitted through the selected area of the recording medium are transmitted to the optical detecting device through the light-receiving optical fibers. Hence, the light source device which includes a laser source and which may include a collimator lens, and the optical detecting device which may include a convex lens, a cylindrical lens and optical sensors, may be disposed without positional alignment with a movable objective device which may include a convergence objective lens that is disposed opposite to the recording surface of the optical recording medium and that is moved along the recording surface of the medium for recording and reproduction of information on or from the selected area of the recording medium. Accordingly, it is not necessary to establish precise alignment of the optical components of the light source device and the detecting device, relative to the optical components of the objective device. This reduces the required strength or rigidity of a support structure for maintaining relative positional alignment of the optical components of the optical head. Therefore, it is possible to reduce the size and weight of the optical head, more precisely of the movable section of the optical head, and the cost of the optical head. The reduction in moment of inertia of the movable section of the optical head provides for shortening of an access time of the optical head that is required for an access to a selected area on the recording medium. The access time may be remarkably reduced, especially when the movable section of the optical head incorporates only the objective device. Further, in the case where the light source device and the detecting device are located on the same side of the recording medium, a beam splitter, a quarter-wave plate and other components for separating the emitted and reflected beams are not necessary, and the number of the optical components of the optical head is reduced. As a result, the efficiency of transmission of light through the optical system is improved, and at the same time the weight of the head is further reduced.

According to another aspect of the present invention, there is provided an optical data storage and readout apparatus having an optical head which includes (a) a light source device comprising a plurality of laser sources for producing plural kinds of laser beams having different wavelengths, (b) means for converging the plural kinds of laser beams on selected areas on respective plural storage layers of an optical recording medium on or from which information is recorded or read out, and (c) an optical detecting device for detecting signal beams reflected by or transmitted through the selected areas on the storage layers which are irradiated by the converged laser beams, comprising: a collector which merges the plural kinds of laser beams into a single flux; a single-core light-emitting optical fiber which receives at its one end the single flux of the plural kinds of laser beams from the collector and emits the laser beams from its other end toward the surface of the recording medium; and a plurality of light-receiving optical fibers which receive at their one end the signal beams from the selected areas on the storage layers, and transmit the signal beams to the optical detecting device.

In the optical data storage and readout apparatus constructed as described above, the plural kinds of laser beams which are produced by the respective laser sources are merged by the collector into a single flux, and then transmitted through the single light-emitting optical fiber toward the respective storage layers of the recording medium. Therefore, at least the light source device which includes the laser sources and which may include a collimator lens can be disposed without precise alignment with respect to an objective device which may include an objective lens that is disposed opposite to the recording medium and that is movable along the surface of the medium. The elimination of a need of establishing precise relative alignment between the light source device and the objective device is conducive to reduction in strength and weight of the support structure of the optical head, which leads to reduced moment of inertia of the movable section of the optical head, and to reduced cost of manufacture of the optical head. The reduction in moment of inertia of the movable section permits shortening of the access time of the optical head. This access time may be further shortened if the movable section of the optical head does not carry the light source device and the optical detecting device, that is, if the light source and detecting devices are fixed in position and only the objective device is housed in the movable section to which the light-emitting and light-receiving optical fibers are attached. Further, the instant apparatus does not require a dichroic mirror or other components for merging and separating the plural kinds of laser beams of different wavelengths, nor does it require a half mirror or beam splitter for separating the irradiated and reflected beams. The elimination of these optical components contributes to increased efficiency of light transmission through the optical head, and to a reduced number of the optical components.

BRIEF DESCRIPTION OF THE DRAWINGS

The foregoing and other objectives, features and advantages of the present invention will become more apparent from reading the following detailed description of preferred embodiments of the invention, when considered in connection with the accompanying drawings, in which:

FIGS. 1 and 16 are schematic views of different embodiments of an optical apparatus of the present invention, respectively;

FIGS. 4 through 6 and FIGS. 19 through 21 are illustrations of different modified configurations of end faces of light-emitting and light-receiving optical fibers;

FIGS. 7 through 9 and FIGS. 28 and 29 are illustrations of different modified arrangements for emitting a light beam from the light-emitting optical fiber toward an optical recording medium;

FIGS. 13 and 14 and FIGS. 31 through 33 are views illustrating modified constructions of the light-receiving optical fibers;

FIGS. 22 and 23 are modified constructions of the light-emitting optical fiber;

FIGS. 24 through 27 are views corresponding to FIG. 17, indicating modified forms of positioning of the laser beam spots relative to the recording track;

FIG. 30 is a view showing a modified light source device for producing laser beams to be transmitted through two light-emitting optical fibers of the embodiment of FIG. 16;

DETAILED DESCRIPTION OF THE PREFERRED EMBODIMENTS

To further clarify the present invention, several embodiments of the invention will be described referring to the accompanying drawings.

Figure 1:
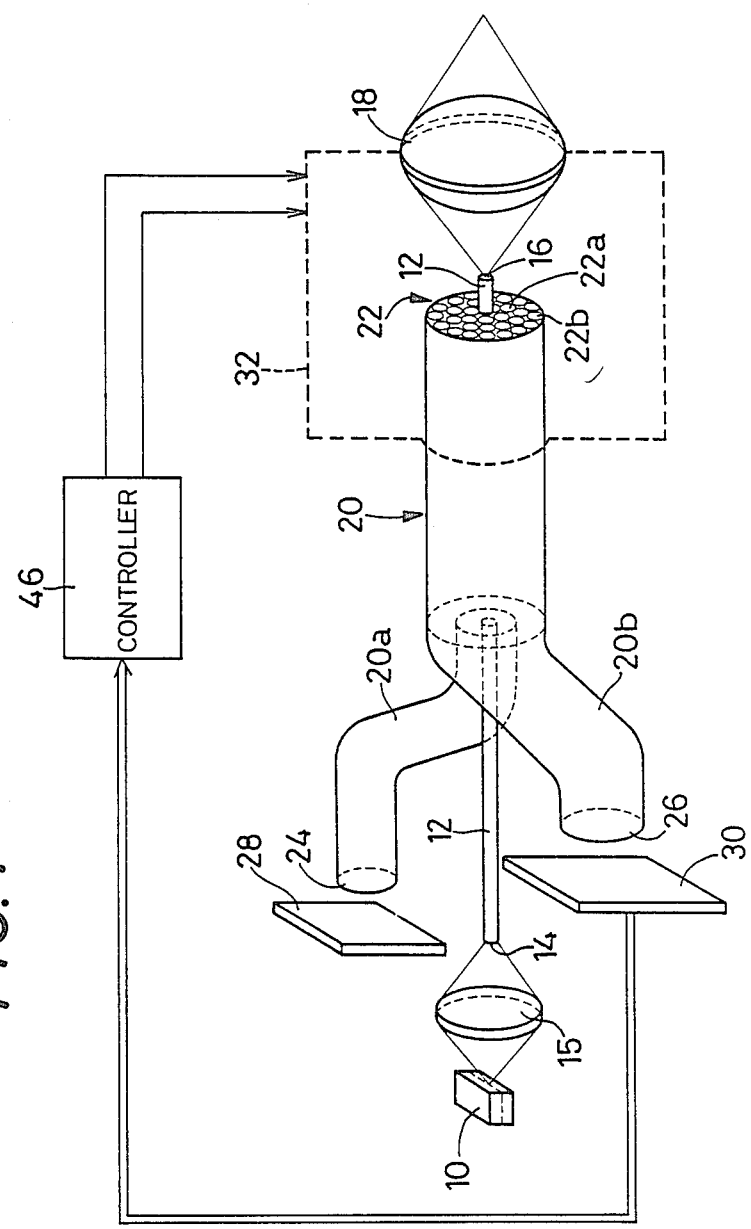

Referring first to FIG. 1, there is shown an essential part of an optical head of an optical data storage and readout apparatus according to one preferred form of the invention. In the figure, reference numeral 10 designates a stationary semiconductor laser element which produces laser beams, which are incident upon a collimator lens 15 adjacent to the laser element 10. The lens 15 condenses the incident laser beams at an entrance-side end 14 of a single flexible light-emitting optical fiber 12, so that the condensed laser beams are transmitted through the light-emitting optical fiber 12. Thus, the semiconductor laser element 10 and the light-emitting optical fiber 12 are optically coupled to each other. The laser beam transmitted through the light-emitting optical fiber 12 is radiated from an exit-side end 16 of the optical fiber 12. The radiated laser beams are converged by an objective lens 18 and thus focused at a specified point on a recording surface of an optical recording medium (not shown). Described in more detail, the converged laser beam is aimed at a specified point on a selected recording track on the recording medium, for storing or reading information on or from the selected recording track.

A radiation reflected by the recording medium is received by entrance-side ends 22 of a multiplicity of flexible light-receiving optical fibers 20 which are bundled around the light-emitting optical fibers 12. That is, the light-emitting optical fiber 12 extends through the bundle of the light-receiving optical fibers 20, in aligned relation with the centerline of the bundle of the optical fibers 20. The flexible bundle of the light-receiving optical fibers 20 is branched into two sheaves 20a, 20b, so that the reflected light beams transmitted through the individual optical fibers 20 are emitted from an exit-side end 24 or 26 of the corresponding sheaves 20a, 20b, toward a stationary first or a stationary second optical sensor 28, 30, respectively. The first optical sensor 28 receives the light beams to produce data signals (which will be described), while the second optical sensor 30 receives the light beams to produce focusing and tracking signals (which will be described). In this specific embodiment, the light-receiving optical fibers 20 in the radially inner portion of the flexible bundle constitute the inner fiber sheave 20a leading to the first optical sensor 28, while the optical fibers 20 in the radially outer portion of the flexible bundle constitute the outer fiber sheave 20b leading to the second optical sensor 30. For convenience sake, reference characters 20a and 20b are used also to designate the radially inner and outer groups of the light-receiving optical fibers 20, respectively. Of all the light beams reflected by the recording medium, the reflected light beams which are indicative of the information stored on a track of the medium propagate along substantially the same path as the light beams emitted from the light-emitting optical fiber 12, and are received by the inner light-receiving optical fibers 20a at their entrance-side ends 22a. Meanwhile, the reflected light beams which are usable for the focusing and tracking signals are beams including the beams which are diffracted by pits or grooves defining the tracks on the recording medium. These beams for the tracking and focusing signals (hereinafter referred to as "focusing and tracking signal beams") are received by the outer light-receiving optical fibers 20b at their entrance-side ends 22b. Since the focusing and tracking signal beams are received at the radially outer portion 20b of the end face of the optical fiber bundle 20, these focusing and tracking signal beams are less likely to be influenced by a variation in the amount of the beams indicative of the stored information (hereinafter referred to as "data signal beams"). In this connection, it is noted that the amount of the data signal beams is changed between two distinct values corresponding to the logical "0" and "1" of the stored information. The focusing signal beams represent a deviation of the focal point of the light beams emitted from the light-emitting optical fiber 12, in the direction along the optical axis of the objective lens 18. On the other hand, the tracking signal beams represent a deviation of the focal point in the direction parallel to the surface of the recording medium (in the direction of width of the recording tracks).

The first optical sensor 28 has a light-sensitive element which receives the data signal beams transmitted through the inner light-receiving optical fibers 20a (emitted from the exit-side end 24 of the inner sheave 20a), and which converts the received light beams into the corresponding electrical data signals. Similarly, the second optical sensor 30 has a plurality of light-sensitive elements which receive the focusing and tracking signal beams transmitted through the outer light-receiving optical fibers 20b (emitted from the exit-side end 26 of the outer sheave 20b), and which convert the received light beams into the corresponding electrical focusing and tracking signals. These focusing and tracking signals are applied to a controller 46. For example, the second optical sensor 30 has four light-sensitive elements (areas) which correspond to four sectors of the face of the exit-side end 26 of the outer sheave 20b. The tracking signal is produced based on differences in the amount of the beams received by these four light-sensitive elements, while the focusing signal is produced based on a total amount of the beams received by all of the light-sensitive elements.

Figure 2:
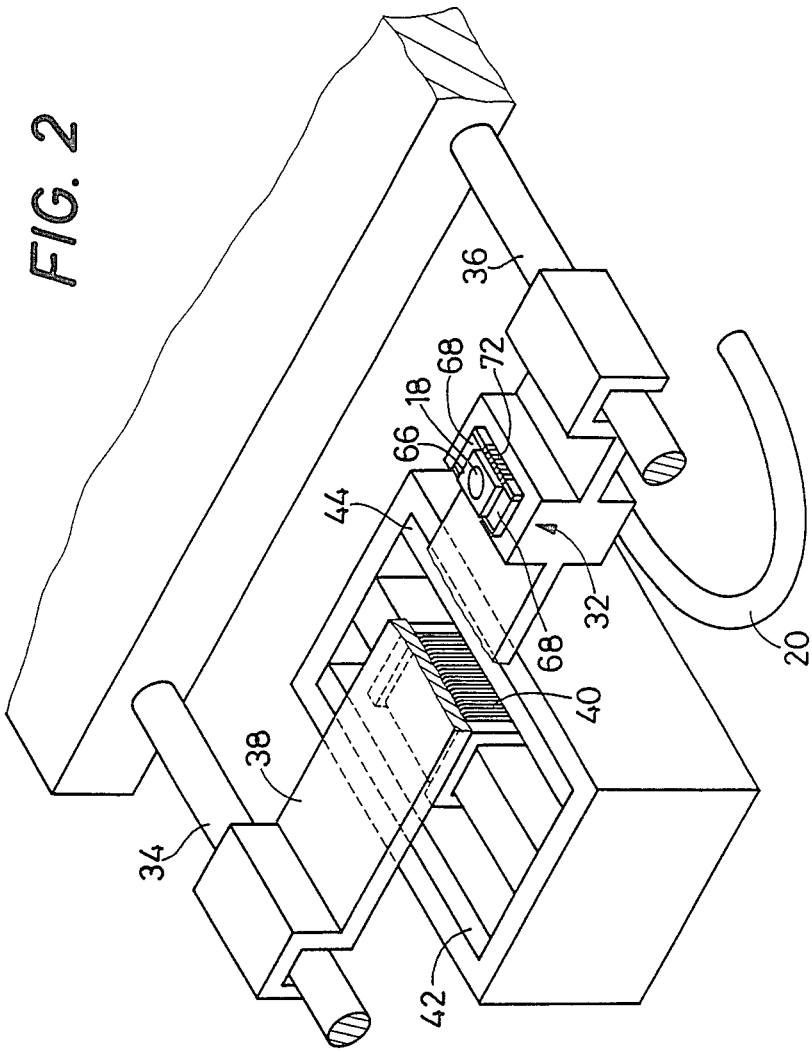
FIG. 2 is a perspective view of a movable section of an optical head of the embodiments of FIGS. 1 and 16.

The optical head has a movable section 32 which is movable in the direction parallel to the surface of the recording medium, more precisely in the direction across the width of the recording tracks. The movable section 32 incorporates the previously described objective lens 18, while the ends (16, 22) of the light-emitting and light-receiving optical fibers 12, 20 are connected to the movable section 32 such that the ends of the optical fibers 12, 20 are opposite to the objective lens 18. Thus, the movable section 32 of the optical head is relatively small-sized and lightweight. As shown in FIG. 2 for illustrative purpose only, the movable section 32 is mounted on a movable plate 38 which is slidably supported on a pair of fixed guide rods 34, 36. To the movable plate 38, there is attached a moving coil 40 which is disposed in a magnetic field formed by a pair of fixed, spaced-apart permanent magnets 42, 44. The movable plate 38 is moved on the guide rods 34, 36 by controlling the energization of the moving coil 40, whereby the movable section 32 may be positioned into alignment with a selected track on the optical recording medium.

The movable section 32 of the optical head is provided with a focusing device for moving the objective lens (convex lens) 18 in the first direction along its optical axis, and a tracking device for moving the objective lens 18 in the second direction perpendicular to the optical axis. These focusing and tracking devices are controlled by the controller 46 based on the focusing signals and the tracking signals, respectively. By activating the focusing and tracking devices, the size of the laser beam spot on the recording medium and the location of the beam spot with respect to the selected track can be adjusted properly, in order to compensate for a variation in the distance between the medium surface and the objective lens 18, and in order to compensate for a variation in the position of the selected track in the direction parallel to the medium surface (perpendicular to the optical axis of the objective lens 18), respectively.

Figure 3:
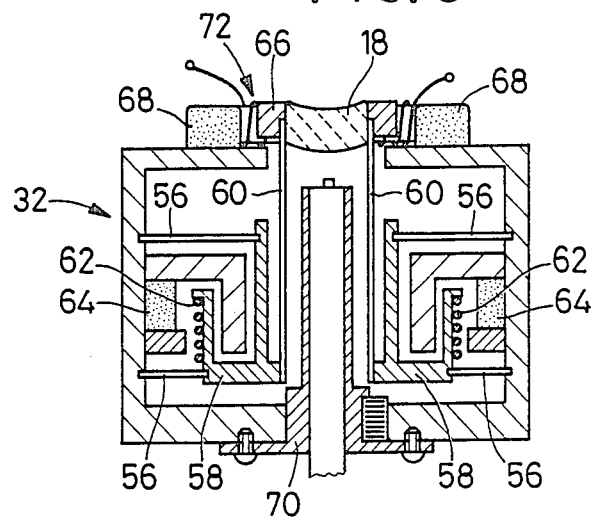
FIG. 3 is an elevational view in cross section of the movable section of the optical head of FIG. 2.

More specifically described referring to FIG. 3, the objective lens 18 is connected via sheet springs 60 to a movable member 58 which is supported by sheet springs 56 movably in the first direction parallel to the optical axis of the objective lens 18. In this arrangement, the objective lens 18 is movable not only in the direction parallel to the optical axis, but also in the second direction perpendicular to the optical axis (in the direction across the width of the tracks on the recording medium). The movable member 58 has a focusing coil 62 fixed thereto, which coil 62 is exposed to a magnetic field of a permanent magnet 64. The position of the movable member 48 and consequently the position of the objective lens 18 along the optical axis are changed by controlling an electric current to be supplied for the controller 46 to the focusing coil 62. In the meantime, the objective lens 18 is supported by a magnetic member 66 which is exposed to a magnetic field of a permanent magnetic 68. The magnetic member 66 is equipped with a tracking coil 72 which is energized under the control of the controller 46. By controlling an electric current to be supplied to the tracking coil 72, the objective lens 18 is moved perpendicularly to the optical axis. The tracking coil 72 is disposed so as to change a magnetic force acting on the magnetic member 66 in the magnetic field of the permanent magnet 68. Thus, in the present embodiment, the focusing coil 62 and the permanent magnet 64 constitute a focusing actuator for axial movement of the objective lens 18 in the first direction, while the tracking coil 72 and permanent magnet 68 constitute a tracking actuator for radial movement of the objective lens 18 in the second direction.

The movable section 32 has a cylindrical fiber holder 70 which retains the end portions of the light-emitting and light-receiving optical fibers 12, 20 such that the exit-side end 16 of the light-emitting optical fiber 12 is substantially aligned with the optical axis of the objective lens 18.

In the optical data storage and readout apparatus constructed as described above, a light source device comprising the semiconductor element 10 and the lens 15, and an optical detecting device comprising the first optical sensor 28 for the data signals and the second optical sensor 30 for the focusing and tracking signals, are stationary or fixed in position. On the other hand, an objective device comprising the objective lens 18 is provided on the movable section 32 which is movable in the mutually perpendicular directions, along the surface of the recording medium across the recording tracks, and along the optical axis of the objective lens 18 toward and away from the surface of the recording medium, as previously discussed. Unlike a conventional arrangement in which the light source device, detecting device and objective device are assembled in the housing of an optical head in precise alignment with each other, the present arrangement has eliminated a beam splitter (for separation of emitted and reflected beams), a quarter-wave plate and other optical components, namely, has reduced the number of the optical components. Accordingly, the light transmission efficiency of the optical system is improved, and the overall size and weight of the optical head are reduced. Further, the present arrangement is advantageous in that the light source device (laser element 10, collimator lens 15, etc.) and the detecting device (optical sensors 28, 30, etc.) need not be aligned with the objective device (objective lens 18 on the movable section 32). Moreover, this elimination of accurate relative alignment of the components allows reduction in the size and strength of a frame or support structure for maintaining such accurate relative alignment, thereby minimizing the size and weight of the movable section 32 of the optical head, and consequently reducing the cost of manufacture. In this connection, it is important to note that the reduced weight of the optical head (more precisely, movable section 32) and the consequently reduced moment of inertia of the same provide for a considerable shortening of an access time of the optical head (the time necessary for accurate access to a specified point on a selected track on the recording medium).

While the movable section 32 in the present embodiment comprises only the objective lens 18, the present invention is advantageous even if the movable section 32 incorporates the light source device and/or the optical detecting device, because it is not necessary to establish precise alignment of the light source device and/or the detecting device with the objective device.

Various modified embodiments of the invention will be described. The same reference numerals as used in the preceding embodiment of FIGS. 1–3 will be used in the modified embodiments, to identify the corresponding components or elements. In the interest of brevity, no repeated description of these components will be provided.

Figure 4:
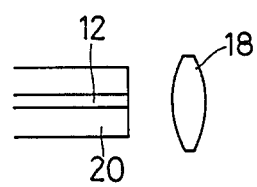
Figure 5:
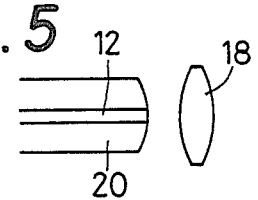
Figure 6:
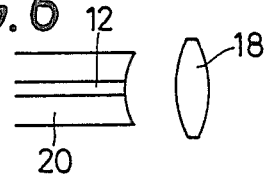
Figure 7:
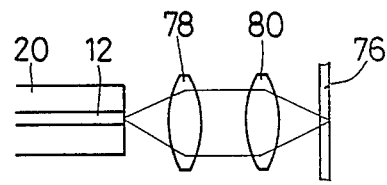
Figure 8:
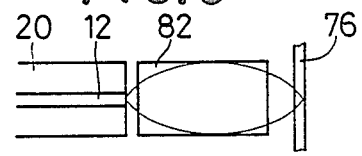
Figure 9:
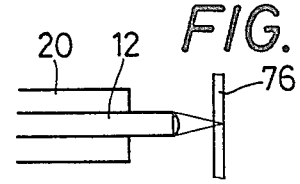

The configurations of the end faces of the light-emitting and light-receiving optical fibers 12, 20 may be modified as illustrated in FIGS. 4, 5 and 6. Namely, the end faces may be straight, convex or concave. Further, the laser beams which are emitted from the exit-side end of the light-emitting optical fiber 12 may be converged on a recording medium 76 by any one of modified arrangements as illustrated in FIGS. 7, 8 and 9. The arrangement of FIG. 7 comprises a convex lens 78 for converting the laser beams into parallel rays, and another convex lens 80 for converging the parallel rays on the surface of the recording medium 76. The arrangement of FIG. 8 uses a convergence waveguide 82 such as a Selfoc lens, for converging the laser beams on the recording medium 76. In the arrangement of FIG. 9, the end face of the light-emitting optical fiber 12 is convexed so as to have the convexed end face function as a convex lens for converging the laser beams on the medium 76.

Figure 10:
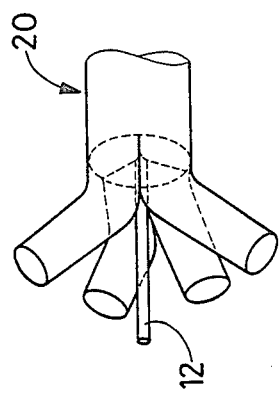
FIGS. 10 and 11 and 12 are perspective views showing modified branching arrangements of the light-receiving optical fibers.
Figure 11:
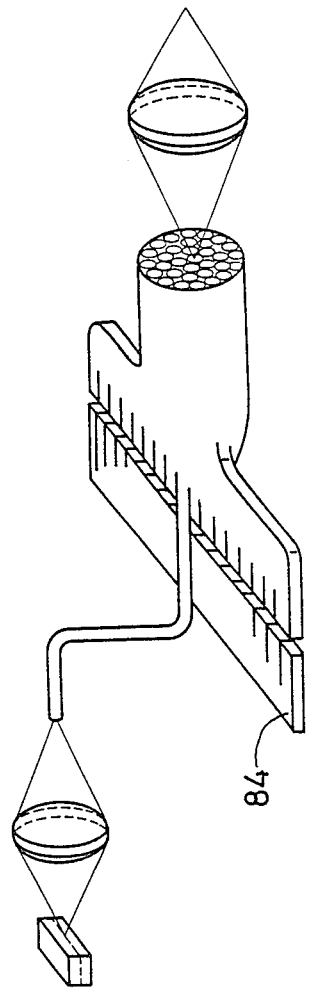

In the embodiment of FIG. 1, the bundle of the light-receiving optical fibers 20 is branched into the inner sheave 20a consisting of the radially inner group of the fibers (20a), and the outer sheave 20b consisting of the radially outer group of the fibers (20b). However, it is possible that the bundle may be branched into three or more sheaves as indicated in FIG. 10. In the example of FIG. 10, the sheaves correspond to sectors of the transverse cross sectional circle of the bundle. Further, the bundle may be branched at random. Another example of branching of the bundle of the light-receiving optical fibers 20 is illustrated in FIG. 11, in which the exit-side ends of the individual optical fibers 20 are positioned opposite to respective multiple light-sensitive elements of a photodiode array 84 used as the first and second optical sensors 28, 30.

Figure 12:
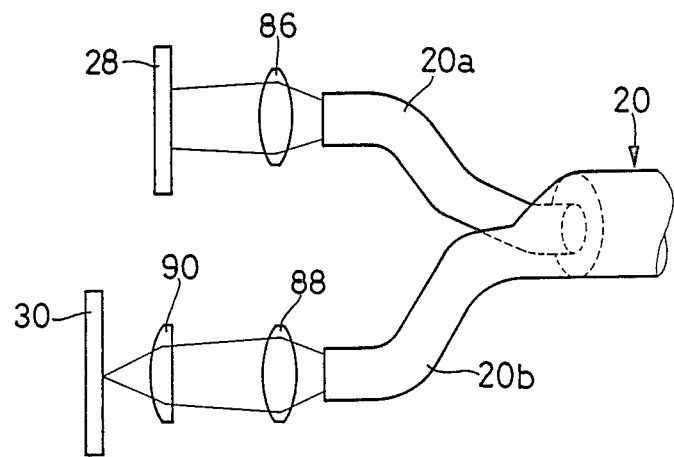

Another modification of the apparatus is shown in FIG. 12, wherein a convex lens 86 is disposed between the first optical sensor 28 and the exit-side end of the inner sheave 20a of the light-receiving optical fibers 20, while a convex lens 88 and a cylindrical lens 90 are disposed between the second optical sensor 30 and the exit-side end of the outer sheave 20b. The convex lens 86 serves to converge the light beams on the light-sensitive element on the first optical sensor 28. The convex lens 88 and the cylindrical lens 90 serve to condense the light beams on the light-sensitive elements on the second optical sensor 30.

Figure 13:
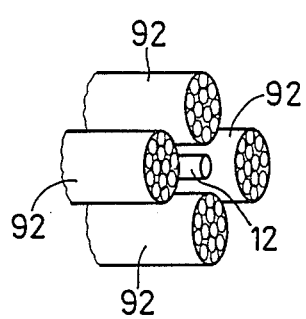
Figure 14:
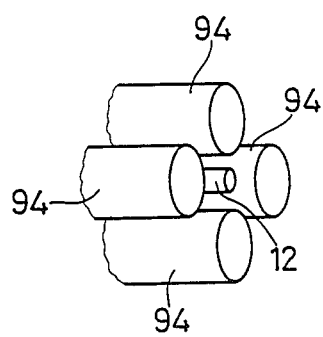

While the light-receiving optical fibers 20 are preferably provided in the form of a multi-core optical fiber (a bundle of multiple fibers) used for a so-called "image guide", it is possible to replace the multi-core bundle of the optical fibers 20 with a plurality of multi-core optical fibers 92 (each consisting of a bundle of multiple fibers) which are disposed around the light-emitting optical fiber 12, in spaced-apart relation with each other circumferentially of the optical fiber 12, as indicated in FIG. 13. Further, the optical fibers 20 may be replaced by a plurality of single-core optical fibers 94 which are disposed around the optical fiber 12, as shown in FIG. 14.

While the optical fibers 12, 20, 92, 94 are generally made of quartz, they may be made of suitable plastics. In this case, the weight of the movable section 32 of the optical head is further reduced. Alternatively, the optical fibers 12, 20, 92, 94 may be optical fibers which have an optical property of maintaining the same plane of polarization of the laser beams propagating therethrough. In this case, information stored on a magneticoptical recording disk may be read by utilizing the polarization plane of the optical fibers.

Figure 15:
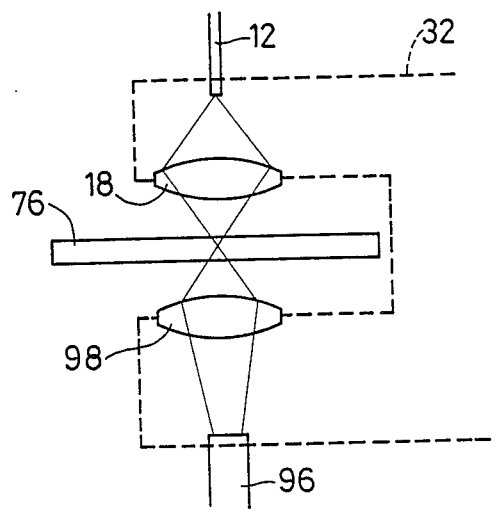
FIGS. 15 and 34 are views showing arrangements for detecting a light beam transmitted through the optical recording medium, rather than reflected by the medium.

FIG. 15 shows a further embodiment of the invention in which the information on the recording medium 76 is read or reproduced by detecting the light which has been transmitted through the medium 76, rather than by detecting the light reflected from the medium 76. This arrangement uses light-receiving optical fibers 96 similar to the optical fibers 20, for guiding the transmitted light to the first and second optical sensors 28, 30, and a convex lens 98 disposed opposite to the end of the optical fibers 96, for converging the transmitted light at the end face of the optical fibers 96. The convex lenses 18 and 98 are disposed on opposite sides of the recording medium 76.

Although the preceding embodiments use a single laser source which produces laser beams of a predetermined wavelength for irradiating a single spot on the recording medium, it is possible that laser beams of two different wavelengths may be used for irradiating two spots on the recording medium.

Figure 17:
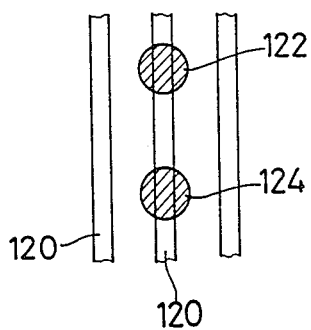
FIG. 17 is an illustration indicating one form of positioning of laser beam spots on a recording track of the recording medium.

Referring to FIG. 16, reference numerals 100, 102 indicate two semiconductor laser elements which generate two kinds of laser beams of different wavelengths. These laser elements 100, 102 are optically connected via respective lenses 112, 114 to entrance-side ends 108, 110 of respective flexible light-emitting optical fibers 104, 106 of single-core type. The laser beams transmitted through the light-emitting optical fibers 104, 106 are emitted from their exit-side ends 116, 118, respectively. The laser beams of different wavelengths emitted from the optical fibers 104, 106 are converged, by the objective lens 18, at two spaced-apart points on a selected track 120 on the recording medium, as illustrated in FIG. 17. Described more specifically, the laser beam of one wavelength is used to form a reading beam spot 122 for reading out the information stored on the selected track 120, while the laser beam of the other wavelength is used to form a recording beam spot 124 for recording information on the track 120. These beam spots 122, 124 are formed concurrently or at different times.

The light beams reflected by the recording medium are received by multiple flexible light-receiving optical fibers 130 at their entrance-side ends 132. Like the optical fibers 20 used in the embodiment of FIG. 1, the optical fibers 130 are bundled around the light-emitting optical fibers 104, 106. The bundle of the light-receiving optical fibers 130 is branched into an inner sheave 130a (consisting of radially inner fibers 130a) and an outer sheave 130b (consisting of radially outer fibers 130b). The data signal beams reflected from the recording medium are received by the inner light-receiving optical fibers 130a at their entrance-side ends 132a, while the focusing and tracking signal beams are received by the outer light-receiving optical fibers 130b at their entrance-side ends 132b. The reflected data signal beams are transmitted through the inner sheave 130a to a first optical sensor 126, while the reflected focusing and tracking signal beams are transmitted through the outer sheave 130b to a second optical sensor 128. The first and second optical sensors 126, 128 have a dichroic mirror or other suitable optical component for detecting only the light beams having the predetermined wavelengths, and are adapted to produce the corresponding data signals and the focusing and tracking signals, respectively, as previously described in connection with the optical sensors 28, 30.

Figure 18:
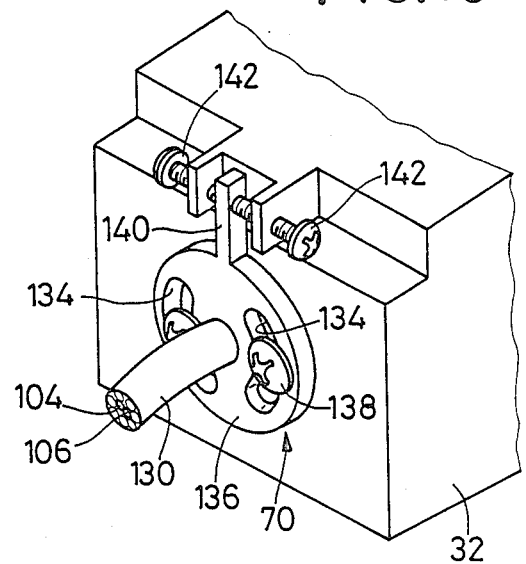
FIG. 18 is a fragmentary view in perspective of the movable section of the optical head, showing the connection of the optical fibers to the movable section.

The single-core light-emitting optical fibers 104, 106 and the light-receiving optical fibers 130 bundled around the optical fibers 104, 106 are retained at their ends 116, 118, 132 in the fiber holder 70 attached to the movable section 32 of the optical head as shown in FIG. 18. This fiber holder 70 is similar to the fiber holder 70 shown in FIG. 3. Stated in greater detail, the fiber holder 70 is a cylindrical member disposed so as to extend into the interior of the movable section 23, such that the fiber holder 70 is rotatable about its axis. Further, the fiber holder 70 has a flange 136 having arcuate slots 134 through which retainer screws 138 extend to fix the fiber holder 70 to the outer surface of the housing of the movable section 32. The flange 136 has a radial extension 140 which is retained by a pair of positioning screws 142, 142. These screws 142 are threadedly supported on the housing of the movable section 32 such that they are movable toward and away from each other in order to rotate the fiber holder 70 via the extension 140. Namely, the angular position of the fiber holder 70 can be adjusted by rotating the positioning screws 142 with the retainer screws 138 loosened. Thus, the positioning screws 142 and the extension 140 constitute a device for adjusting the angular position of the fiber holder 70, while the retainer screws 138 serve as a device for fixing the fiber holder 70 at a suitable angular position with respect to the housing of the movable section 32.

In the present embodiment, the light source device (100, 102) and the detecting device (126, 128) are fixed in position, and only the objective device (movable section 32 incorporating the objective lens 18) is adapted to be movable. Therefore, the present embodiment also enjoys the same advantages offered by the first embodiment of FIG. 1, such as shortened access time of the optical head owing to reduced weight of the optical head, increased efficiency of light transmission owing to reduced number of optical components, and reduced cost of manufacture due to freedom from precise alignment of the light source and detecting devices relative to the objective device.

Further, since the angular position of the fiber holder 70 about its axis is adjustable, it is easy to adjust the parallelism of the line passing the reading and recording beam spots 122, 124 (FIG. 17), with respect to the selected track 120. Another advantage of the present embodiment lies in that the exit-side ends 116, 118 of the light-emitting optical fibers 104, 106 are fixed to each other, and therefore the adjustment of a spacing between the two beam spots 122, 124 is unnecessary.

The exit-side end faces of the optical fibers 104, 106, 130 may take a straight flat, convex or concave configuration, as indicated in FIGS. 19, 20 and 21. If necessary, the end portions of the light-emitting optical fibers 104, 106 may be spaced apart by a suitable distance from each other as shown in FIG. 22. Further, three or more light-emitting optical fibers may be provided so as to extend through the bundle of the light-receiving optical fibers 130, as indicated in FIG. 23. Where three light-emitting optical fibers of single-core type are provided, for example, the corresponding three beam spots may be arranged with respect to the selected recording track 120, as illustrated in FIGS. 24 and 25. In the case of FIG. 25, the three beam spots are placed on a straight line intersecting the selected track 120 at a suitable angle, for effecting a three-beam tracking. As further modifications, it is possible to position one beam spot on one track 120 and another beam spot on the adjacent track 120, as illustrated in FIG. 26, or position two or more beam spots on each of the two adjacent tracks 120 as shown in FIG. 27.

Further, the laser beams to be emitted from the light-emitting optical fibers 104, 106 may be converged on the surface of the recording medium 76, by means of a convergence waveguide 144 such as a Selfoc lens, as shown in FIG. 28. Alternatively, the optical fibers 104, 106 may be formed with convex end faces which function as convex lenses for converging the laser beams on the surface of the medium 76, as illustrated in FIG. 29.

Although the embodiment of FIG. 16 uses the two semiconductor laser elements 100, 102 which produce laser beams having different wavelengths, it is possible to use two laser sources which produce laser beams of the same wavelength. Further, it is possible to use a single laser element 146, and a splitter 148 which splits the laser beam from the element 146, for distribution into the two optical fibers 104, 106, as indicated in FIG. 30.

While the light-receiving optical fibers 130 used in the embodiment of FIG. 16 are preferably a multi-core optical fiber used for a so-called "image guide", the multi-core bundle of the optical fibers 130 may be replaced by a plurality of single-core optical fibers 150 arranged around the light-emitting optical fibers 104, 106, as shown in FIG. 31. Alternatively, the optical fibers 130 may be replaced by a first multi-core optical fiber 152 through which the optical fiber 104 extends, and a second multi-core optical fiber 154 through which the optical fiber 106 extends, as indicated in FIG. 32. Further, it is possible to dispose plural multi-core optical fibers 156 so as to surround the optical fibers 104, 106, as indicated in FIG. 33.

Figure 34:
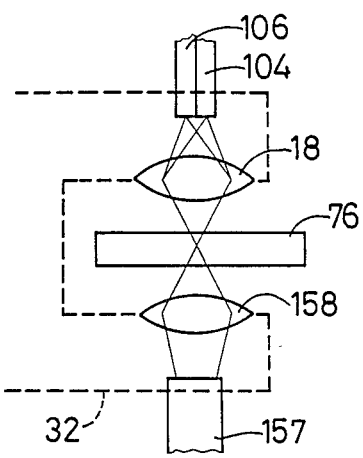
Figure 35:
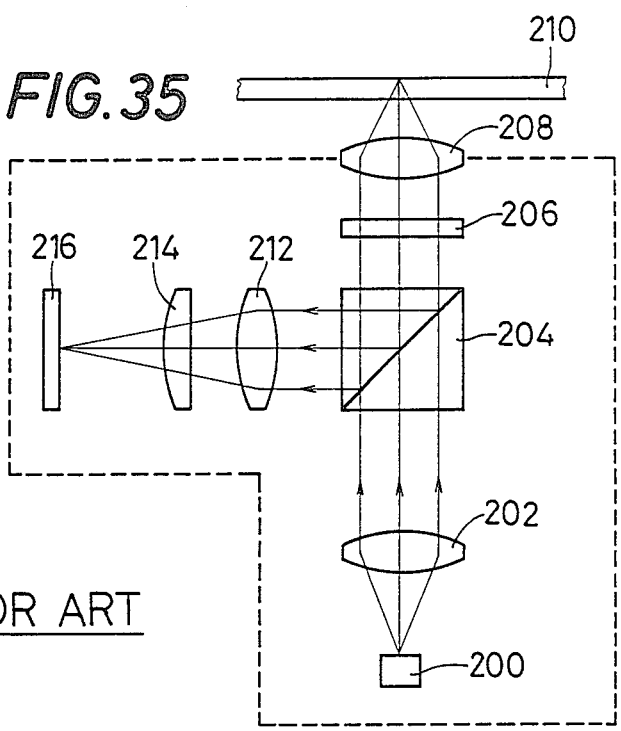
FIG. 35 is a schematic view showing an arrangement of an optical head of a conventional optical data storage and readout apparatus.

FIG. 34 illustrates a modification of the embodiment of FIG. 16, in which the laser beams transmitted through the recording medium 76 are incident upon an objective lens 158 disposed on the side of the medium 76 opposite to the objective lens 18. The laser beams converged by the objective lens 158 are received by light-receiving optical fibers 157 similar to the optical fibers 130 used in the embodiment of FIG. 16.

Figure 36:
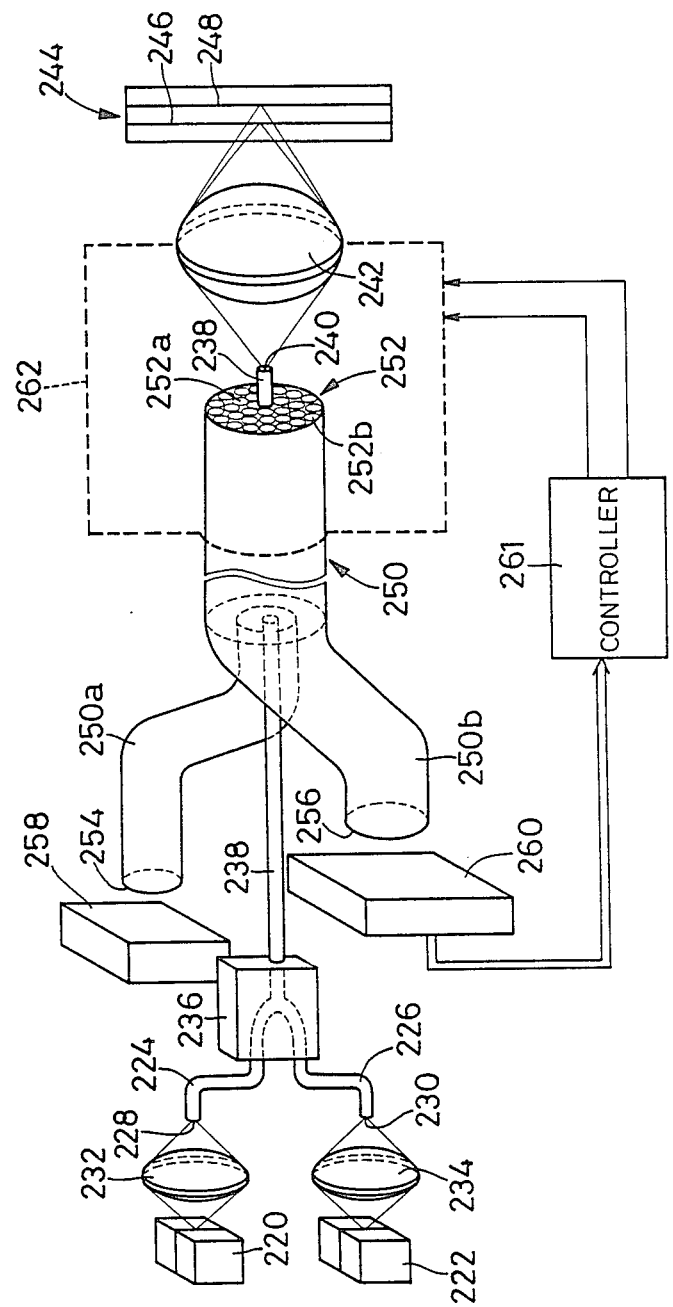
FIG. 36 is a view corresponding to FIG. 1, showing a further embodiment of the present invention.

A further modified embodiment of the optical data storage and readout apparatus of the present invention is schematically illustrated in FIG. 36. In the figure, reference numerals 220, 222 indicate a pair of stationary semiconductor laser elements which produce linearly polarized laser beams having different wavelengths. The linearly polarized laser beams radiated from the respective laser elements 220, 222 are incident upon respective lenses 232, 234 which condense the incident laser beams at the entrance-side ends 228, 230 of respective transmission optical fibers 224, 226. Thus, the semiconductor laser elements 220, 222 are optically coupled to the transmission optical fibers 224, 226, respectively. The laser beams of different wavelengths transmitted through the transmission optical fibers 224, 226 are merged by a collector 236 into a single flux of light beams, namely, introduced into a single-core flexible light-emitting optical fiber 238. The laser beams of different wavelengths propagating through the light-emitting optical fiber 238 are emitted from the exist-side end 240 of the fiber 238, and are converged by an objective lens 242 on a first and a second storage layer 246, 248 of a magneto-optical recording medium 244, respectively. Since the laser beams produced by the two laser elements 220, 222 have different wavelengths, the converged laser beams through the common objective lens 242 have focal points which are distant from each other in the direction of thickness of the recording medium 244. In other words, the two focal points are placed on the surfaces of the respective first and second storage layers 246, 248. When information is recorded on or read out from a selected track on the first or second layer 246, 248, the laser beam of the appropriate wavelength is focused on the surface of the first or second storage layer.

The light beams reflected from the magneto-optical recording medium 244 are received by a multiplicity of flexible light-receiving optical fibers 250 at their entrance-side ends 252. The light-receiving optical fibers 250 are bundled around the light-emitting optical fiber 238, and the bundle of the optical fibers 250 is branched into an inner sheave 250a and an outer sheave 250b, as described in the embodiment of FIGS. 1 and 16. The reflected light beams propagating through the inner sheave 250a are emitted from their exit-side ends 254 and incident upon a stationary first optical sensor 258 for producing data signals representative of the information stored on a selected track on the medium 244. The reflected light beams propagating through the outer sheave 250b are emitted from their exit-side ends 256 and incident upon a stationary second optical sensor 260 for producing focusing and tracking signals. As in the embodiments of FIGS. 1 and 16, the inner sheave 250a leading to the first optical sensor 258 consists of the radially inner optical fibers 250a of the bundle, while the outer sheave 250b leading to the second optical sensor 260 consists of the radially outer optical fibers 250b of the bundle. The entrance-side ends 252a of the radially inner optical fibers 250a receive the data signal beams reflected from the recording medium 244, while the entrance-side ends 252b of the radially outer optical fibers 250b receive the focusing and tracking signal beams which are diffracted by the recording medium 244, as previously discussed in connection with the embodiment of FIG. 1.

The first optical sensor 258 has a light-sensitive element which is responsive to the received data signal beams from the inner sheave 250a, to generate the corresponding electric signals indicative of the information stored on the recording medium 244. If necessary, the first optical sensor 258 may further have an analyzer for detecting an angle of Kerr rotation of the incident light beams. The second optical sensor 260 has a plurality of light-sensitive elements which are responsive to the focusing and tracking signal beams from the outer sheave 250b, to generate the corresponding electric focusing and tracking signals. The first and second optical sensors 258, 260 are further equipped with dichroic mirrors which enable their light-sensitive elements to detect the light beams of two different wavelengths which are reflected from the first and second storage layers 246, 248 of the recording medium 244. However, if the semiconductor laser elements 220, 222 for the laser beams of two different wavelengths are activated alternately in a time-sharing manner, the dichroic mirrors may be eliminated. In this case, it is possible to detect the beams of the two different wavelengths by using common light-sensitive elements for the first and second optical sensors.

The previously indicated objective lens 242 is incorporated in a movable sectin 262 of the optical head which is movable along the surface of the recording medium 244 (in the direction across the width of the recording tracks), and toward and away from the surface of the medium 244. The optical fibers 238, 250 are connected at their ends 240, 252 to the movable section 262. The movable section 262 has the same construction as the movable section 32 of FIGS. 2 and 3 previously described. Thus, the movable section 262 enjoys the previously discussed advantages accruing from its compact and lightweight construction.

The first and second storage layers 246, 248 of the magneto-optical recording medium 244 are made of a suitable magneto-optical material such as GdTbFe, and are spaced apart from each other by a non-magnetic intermediate layer made of SiO$_2$ or similar material. The wavelengths of the laser beams produced by the first and second semiconductor laser elements 220, 222, and the thickness of the first storage layer 246, are determined so that the information stored on one of the first and second storage layers 246, 248 can be read out or retrieved without the retrieved information being influenced by the direction of vertical magnetization of the other storage layer 246 or 248. For example, the laser wavelengths of the laser elements 220, 222 are selected to be about 8300 angstroms and about 7800 angstroms, respectively, while the thickness of the first storage layer 246 is selected to be about 100 angstroms. With the above arrangement, it is possible to read out the information which is recorded on individual spots on the tracks on the first and second storage layers 246, 248 by magnetization of the spots in one of opposite directions normal to the surface of the medium 244, as described in detail in Japanese Patent Application No. 59-228744. The depth of focus of the laser beams produced by the two semiconductor laser elemetns 220, 222 is selected to be smaller than the thickness of the intermediate layer between the first and second storage layers 246, 248, so as to prevent the magnetized spot on one of the first and second storage layers 246, 248 from being influenced by the laser beam which irradiates the magnetized spot on the other storage layer 246, 248 upon reproduction of the information stored on the said other storage layer.

In the optical data storage and readout apparatus constructed as described above, a light source device comprising the semiconductor laser elements 220, 222 and the lenses 232, 234, and a detecting device comprising the first optical sensor 258 for the data signals and the second optical sensor 260 for the focusing and tracking signals, are stationary devices fixed in position. On the other hand, an objective device comprising the objective lens 242 is housed in the movable section 262 which is moved along the surface of the recording medium 244 in the direction across the width of the recording tracks. Hence, the present embodiment of FIG. 36 enjoys the same advantages as the previously illustrated embodiments of FIGS. 1 and 16, namely, shortened access time of the optical head owing to reduced weight of the optical head, increased efficiency of light transmission owing to reduced number of optical components, and reduced cost of manufacture thanks to freedom from precise alignment of the light source and detecting devices relative to the objective device.

Although the movable head 262 of the present embodiment incorporates only the objective device of the optical system, the present invention is advantageous even if the movable section 262 incorporates the light source device and/or the detecting device, in that precise relative alignment of the optical components within the movable section 262 is not necessary.

Figure 37:
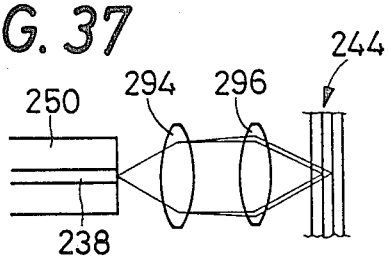
FIGS. 37 through 39 are views of the embodiment of FIG. 36, corresponding to FIGS. 7 through 9, respectively.
Figure 38:
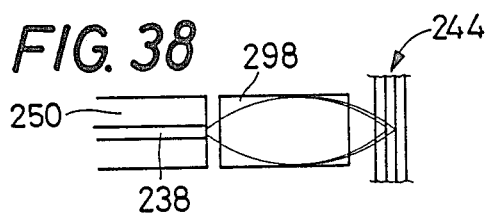
Figure 39:
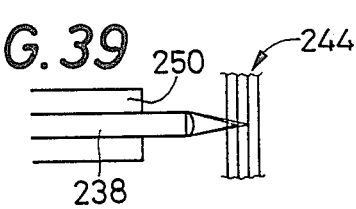

The optical fibers 238, 250 may be formed with their ends 240, 252 having a straight flat, convex or concave shape as illustrated in FIGS. 4, 5 and 6. Further, the convergence of the laser beams emitted from the exit-side end 240 of the light-emitting optical fiber 238 may be achieved by means of any one of the arrangements illustrated in FIGS. 37, 38 and 39, which are similar to those shown in FIGS. 7, 8 and 9, respectively, with the exception that the recording medium 244 used in the present embodiment is a magneto-optical medium having two storage layers which are magnetized by laser beams of two different wavelengths, respectively.

The bundle of the light-receiving optical fibers 250 may be branched into three or more sheaves, in the same manner as shown in FIG. 10. Alternatively, the individual optical fibers 250 of the bundle may be separated from each other so that their exit-side ends are positioned opposite to respective light-sensitive elements of a photodiode array used as the first and second optical sensors 258, 260, in the same manner as shown in FIG. 11.

Figure 40:
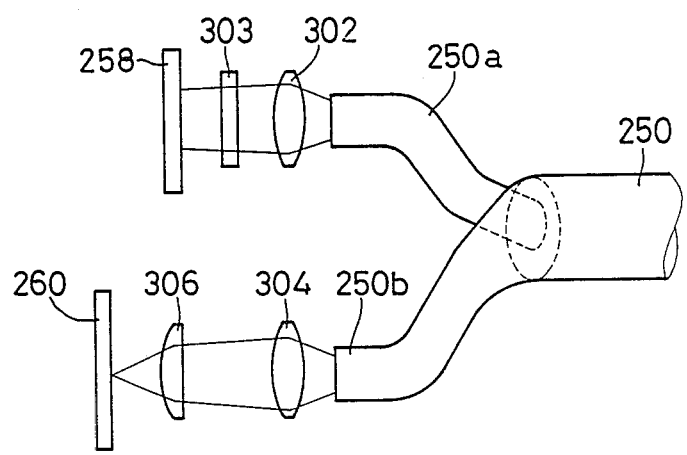
FIG. 40 is a view of the embodiment of FIG. 36, corresponding to FIG. 12.

Another modified form of the embodiment of FIG. 36 is illustrated in FIG. 40 wherein, between the first optical sensor 258 and the inner sheave 250a, there are disposed a convex lens 302 for codensing the data signal beams on the light-sensitive element of the first optical sensor 258, and an analyzer 303 for detecting an angle of Kerr rotation of the data signal beams. Meanwhile, there are disposed a convex lens 304 and a cylindrical lens 306 for condensing the focusing and tracking signal beams on the light-sensitive elements of the second optical sensor 260, between the second optical sensor 260 and the outer sheave 250b.

Further, the light-receiving optical fibers 250 may take modified forms, as indicated at 92, 94 in FIGS. 13 and 14. The optical fibers 238, 250, which are preferably made of quartz, may be made of plastics. In this case, the movable section 262 may be further reduced in weight. If needed, the optical fibers 238, 250 may be optical fibers which have an optical property of maintaining the same plane of polarization of the laser beams propagating therethrough. In this case, the plane of polarization of the laser beams is prevented from being rotated during propagation of the laser beams, whereby the reproduction of the stored information from the magneto-optical recording medium 244 can be attained with improved accuracy.

Figure 41:
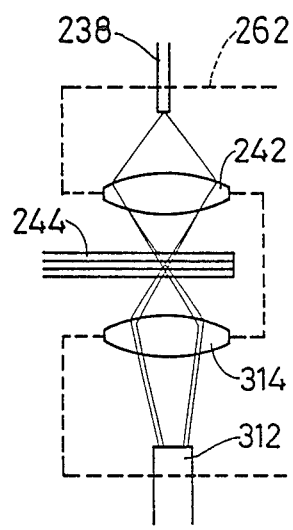
FIG. 41 is a view of the embodiment of FIG. 36, corresponding to FIG. 15.

Yet another modification of the embodiment of FIG. 36 is shown in FIG. 41, wherein the laser beams emitted from the optical fiber 238 and transmitted through the recording medium 244 are incident upon a convex lens 314 disposed on the side of the medium 244 remote from the objective lens 242. The light beams converged by the convex lens 314 are received by light-receiving optical fibers 312 similar to the optical fibers 250, and transmitted through the optical fibers 312 to the first and second optical sensors 258, 260.

While the illustrated embodiment of FIG. 36 uses the same light source device (semiconductor laser elements 220, 222) for recording information on the medium 244 as well as for reading information from the medium 244, it is possible that two separate light source devices are used for the reading and recording applications, respectively.

In the embodiment of FIG. 36, two kinds of laser beams of different wavelengths are used for the two storage layers of the recording medium. It is also possible to use three or more kinds of laser beams of different wavelengths for the corresponding storage layers of a recording medium. In this instance, the collector 236 should be modified to merge these different kidns of laser beams into a single flux of light beams.

While the present invention has been described in detail in its preferred embodiments and their modified arrangements or forms, it is to be understood that the invention is by no means confined to the precise details of the disclosure contained herein, but may be embodied with various other changes, modifications and improvements which may occur to those skilled in the art, without departing from the spirit and scope of the invention defined in the appended claims.

What is claimed is:

1. An optical data storage and readout apparatus having an optical head comprising:
   a light source device including a plurality of laser sources for producing plural kinds of laser beams having different wavelengths;
   means for converging the plural kinds of laser beams on selected areas on respective plural storage layers of an optical recording medium on or from which information is recorded or read out;
   an optical detecting device for detecting signal beams reflected by the selected areas on the storage layers which are irradiated by the converged laser beams;
   a collector which merges said plural kinds of laser beams into a single flux;
   a single-core light-emitting optical fiber which receives at its one end said single flux of said plural kinds of laser beams from said collector and emits the laser beams from its other end toward the surface of the record medium; and
   a plurality of light-receiving optical fibers which are disposed around said single-core light-emitting optical fiber and which receive at their one end said signal beams from said selected areas on said storage layers, and transmit the signal beams from their other end to said optical detecting device,
   wherein said optical head has a movable section which comprises a convex lens disposed between said optical recording medium and said other end and said one end of said light-emitting and light-receiving optical fibers, a focusing actuator, and a tracking actuator, said convex lens converging said laser beams on said selected areas of the storage layers of said recording medium, said movable section being movable in first direction along an optical axis thereof and in a second direction across the width of recording tracks on said recording medium, said focusing actuator positioning said convex lens in said first direction, and said tracking actuator positioning said convex lens in said second direction.

2. An optical data storage and readout apparatus according to claim 1, wherein said plurality of light-receiving optical fibers comprise a single bundle of a multiplicity of optical fibers, said single-core light-emitting optical fiber extending through said single bundle of the light-receiving optical fibers in aligned relation with a centerline of said single bundle.

3. An optical data storage and readout apparatus according to claim 1, wherein said plurality of light-receiving optical fibers comprise a plurality of multi-core optical fibers which are disposed around said single-core light-emitting optical fiber, each of said multi-core optical fibers comprising a bundle of multiple fibers.

4. An optical data storage and readout apparatus according to claim 1, wherein said plurality of light-receiving optical fibers comprise a plurality of single-core optical fibers which are disposed around said single-core light-emitting optical fiber.

5. An optical data storage and readout apparatus according to claim 1, wherein said plurality of light-receiving optical fibers are provided in the form of a single bundle which is branched, at the other end of the light-receiving optical fibers, into an inner sheave and an outer sheave, said inner sheave comprising the light-receiving optical fibers said one end of which is located in a radially inner portion of said single bundle so as to receive primarily data signal beams of said signal beams which are indicative of information stored on said selected area of the recording medium, said outer sheave comprising the light-receiving optical fibers said one end of which is located in a radially outer portion of said single bundle so as to receive primarily focusing and tracking signal beams of said signal beams, said tracking signal beams being indicative of a position of each of said selected areas on a recording track on said storage layers, said focusing signal beams being indicative of a size of a spot of the laser beams converged on each of said storage layers.

6. An optical data storage and readout apparatus according to claim 5, wherein said optical detecting device comprises a first optical sensor for detecting said data signal beams emitted from an end of said inner sheave, and a second optical sensor for detecting said focusing and tracking signals emitted from an end of said outer sheave.

7. An optical head for recording and retrieving information on or from an optical recording medium, comprising:
- a stationary light source device for producing laser beams;
- a movable objective lens for converging the laser beams on a selected area of a surface of said recording medium;
- a stationary optical detecting device for detecting signal beams reflected by or transmitted through the selected area of the recording medium which is irradiated by the converged laser beams;
- at least one flexible light-emitting optical fiber which receives at its one end said laser beams from said stationary light source device and emits the laser beams from its other end toward said surface of the recording medium; and
- a plurality of flexible light-receiving optical fibers which receive at their one end said signal beams from said selected area of the recording medium, and transmit the signal beams from their other end to said optical detecting device,
- said one end of said at least one flexible lightemitting optical fiber being fixedly disposed opposite to said stationary light source device, and the other end of said plurality of flexible light-receiving optical fibers being fixedly disposed opposite to said stationary optical detecting device, said other end of said at least one light-emitting optical fiber and said one end of the said pluralty of lightreceiving optical fibers being fixedly disposed opposite to and movable together with said movable objective lens,
- wherein said optical head has a movable section which comprises said movable objective lens, a focusing actuator, and a tracking actuator, said movable section being movable in a first direction along an optical axis thereof and in a second direction across the width of recording tracks on said recording medium, said focusing actuator positioning said objective lens in said first direction, and said tracking actuator positioning said objective lens in said second direction.

8. An optical data storage and readout apparatus having an optical head which includes a light source device for producing laser beams, means for converging the laser beams on a selected area of a surface of an optical recording medium on or from which information is recorded or read out, and an optical detecting device for detecting signal beams reflected by or transmitted through the selected area of the recording medium which is irradiated by the converged laser beams, comprising:
- at least one light-emitting optical fiber which receives at its one end said laser beams from said light source device and emits the laser beams from its other end toward said surface of the recording medium; and
- a plurality of light-receiving optical fibers which receive at their one end said signal beams from said selected area of the recording medium, and transmit the signal beams from their other end to said optical detecting device;
- said optical head having a movable section which is movable along the surface of said recording medium, said one end of said at least one light-emitting optical fiber and said other end of said plurality of light-receiving optical fibers being fixed in position, and said other end of said at least one lightemitting optical fiber and said one end of said plurality of light-receiving optical fibers being attached to said movable section;
- said movable section of the optical head comprising a convex lens disposed between said optical recording medium and said other end and said one end of said light-emitting and lightreceiving optical fibers, a focusing actuator and a tracking actuator, said convex lens converging said laser beams on said selected area of the recording medium, said movable section being movable in a first direction along an optical axis thereof and in a second direction across the width of recording tracks on said recording medium, said focusing actuator positioning said convex lens in said first direction, and said tracking actuator positioning said convex lens in said second direction.

9. An optical data storage and readout apparatus according to claim 8, wherein said plurality of light-receiving optical fibers comprise a single bundle of a multiplicity of optical fibers, said at least one light-emitting optical fiber extending through said single bundle of the light-receiving optical fibers in aligned relation with a centerline of said single bundle.

10. An optical data storage and readout apparatus according to claim 8, wherein said plurality of light-receiving optical fibers comprise a plurality of multicore optical fibers which are disposed around said at least one light-emitting optical fiber, each of said multicore optical fibers comprising a bundle of multiple fibers.

11. An optical data storage and readout apparatus according to claim 8, wherein said plurality of light-receiving optical fibers comprise a plurality of singlecore optical fibers which are disposed around said at least one light-emitting optical fiber.

12. An optical data storage and readout apparatus according to claim 8, wherein said pluraltiy of light-receiving optical fibers are provided in the form of a single bundle which is branched, at the other end of the light-receiving optical fibers, into an inner sheave and an outer sheave, said inner sheave comprising the light-receiving optical fibers said one end of which is located in a radially inner portion of said single bundle so as to receive primarily data signal beams of said signal beams which are indicative of information stored on said selected area of the recording medium, said outer sheave comprising of the light-receiving optical fibers said one end of which is located in a radially outer portion of said single bundle so as to receive primarily focusing and tracking signal beams of said signal beams, said tracking signal beams being indicative of a position of said selected area on a recording rack of said recording medium, said focusing signal beams being indicative of a size of a spot of said laser beams converged on said recording track.

13. An optical data storage and readout apparatus according to claim 12, wherein said optical detecting device comprises a first optical sensor for detecting said data signal beams emitted from the end of said inner sheave, and a second optical sensor for detecting said focusing and tracking signals emitted from the end of said outer sheave.

14. An optical data storage and readout apparatus according to claim 8, wherein said light source device comprises at least two laser sources which produce laser beams having different wavelengths, said at least one light-emitting optical fiber comprising at least two single-core optical fibers which receive said laser beams of the different wavelengths, respectively.

15. An optical data storage and readout apparatus according to claim 8, wherein said movable section of the optical head comprises: a cylindrical fiber holder to which are fixed said other end of said at least one light-emitting optical fiber and said one end of said plurality of light-receiving optical fibers, and which is supported rotatably about its axis; a rotary positioning device for rotating said fiber holder about said axis thereof to adjust an angular position of the fiber holder; and a fixing device for fixing said fiber holder at the adjusted angular position.

16. An optical data storage and readout apparatus having an optical head comprising:
a light source device including a plurality of laser sources for producing plural kinds of laser beams having different wavelengths;
means for converging the plural kinds of laser beams on selected areas on respective plural storage layers of an optical recording medium on or from which information is recorded or read out;
an optical detecting device for detecting signal beams reflected by or transmitted through the selected areas on the storage layers which are irradiated by the converged laser beams;
a collector which merges said plural kinds of laser beams into a single flux;
a single-core light-emitting optical fiber which receives at its one end said single flux of said plural kinds of laser beams from said collector and emits the laser beams from its other end toward the surface of the recording medium; and
a plurality of light-receiving optical fibers which receive at their one end said signal beams from said selected areas on said storage layers, and transmit the siganl beams from their other end to said optical detecting device;
said optical head having a movable section which is movable along the surface of said recording medium, said one end of said at least one light-emitting optical fiber and said other end of said plurality of light-receiving optical fibers being fixed in position, and said other end of said at least one lightemitting optical fiber and said one end of said plurality of light-receiving optical fibers being attached to said movable section;
said movable section of the optical head comprising a convex lens disposed between said optical recording medium and said other end and said one end of said light-emitting and lightreceiving optical fibers, a focusing actuator and a tracking actuator, said convex lens converging said laser beams on said selected areas of the storage layers of the recording medium, said movable section being movable in a first direction along an optical axis thereof and in a second direction across the width of recording tracks on said storage layers, said focusing actuator positioning said convex lens in said first direction, and said tracking actuator positioning said convex lens in said second direction.

17. An optical data storage and readout apparatus having an optical head comprising:
at least two laser sources for producing laser beams having different wavelengths;
means for converging the laser beams on selected areas of a surface of an optical recording medium on or from which information is recorded or read out;
an optical detecting device for detecting signal beams reflected by or transmitted through the selected areas of the recording medium which are irradiated by the respective converged laser beams;
at least two single-core light-emitting optical fibers which respectively receive at their one end said laser beams of the different wavelengths from said at least two laser sources, and emit the laser beams from their other end toward said surface of the recording medium; and
a plurality of light-receiving optical fibers which receive at their one end said signal beams from said selected areas of the recording medium, and transmit the signal beams from their other end to said optical detecting device;
said optical head further comprising a movable section which is movable along the surface of said recording medium, said movable section including: (a) a cylindrical fiber holder to which are fixed said other end of said at lest two single-core light-emitting optical fibers and said one end of said plurality of light-receiving optical fibers, said cylindrical fiber holder being supported rotatably about its axis; (b) a rotary positioning device for rotating said fiber holder about said axis thereof to adjust an angular position of the fiber holder; and (c) a fixing device for fixing said fiber holder at the adjusted angular position.

18. An optical data storage and readout apparatus according to claim 17, wherein said at least two laser sources comprise two laser sources for producing laser beams having two different wavelengths, and said at least two single-core lightemitting optical fibers comprise two single-core optical fibers, the laser beam having one of said two different wavelengths being emitted from one of said two single-core optical fibers so as to form a reading beam spot on said surface of the recording medium for reading out the information from the recording medium, and the laser beam having the other wavelength being emitted from the other of said two single-core optical fibers so as to form a recording beam spot on said surface of the recording medium for recording the information on said recording medium.

19. An optional data storage and readout apparatus according to claim 18, wherein said means for converging the laser beams is operable to converge said laser beams having two different wavelengths so that said reading and recording beam spots are formed at two spaced-apart points on a selected track on said surface of the recording medium.

* * * * *